(No Model.)

F. A. POLKA.
MILK PAIL STRAINER.

No. 439,185. Patented Oct. 28, 1890.

Witnesses
L. C. Hills
E. H. Bond

Inventor
Ferdinand A. Polka
By his Attorney
Chas. H. Fowler

United States Patent Office.

FERDINAND A. POLKA, OF OAKES, NORTH DAKOTA.

MILK-PAIL STRAINER.

SPECIFICATION forming part of Letters Patent No. 439,185, dated October 28, 1890.

Application filed April 22, 1890. Serial No. 349,022. (No model.)

*To all whom it may concern:*

Be it known that I, FERDINAND A. POLKA, a citizen of the United States, residing at Oakes, in the county of Dickey and State of North Dakota, have invented certain new and useful Improvements in Milk-Pail Strainers; and I do hereby declare that the following is a full, clear, and exact description of the same, reference being had to the annexed drawings, making a part of this specification, and to the letters of reference marked thereon.

This invention relates to certain new and useful improvements in milk-pails; and it has for its object to provide an improved pail provided with means for straining the contents and remove therefrom most effectually the dirt, hair, and other foreign matters contained therein.

I aim to provide a device wherein the contents may be strained without agitating the same.

Heretofore it has been the practice to provide milk-pails with strainers in such a manner that in turning the milk out of the pail the milk is agitated sufficiently to dissolve the sediment, and it is thus carried with the milk.

Other objects and advantages of my invention will hereinafter appear, and the novel features thereof will be specifically defined by the appended claims.

The invention is clearly illustrated in the accompanying drawings, which, with the letters of reference marked thereon, form a part of this specification, and in which—

Figure 1:
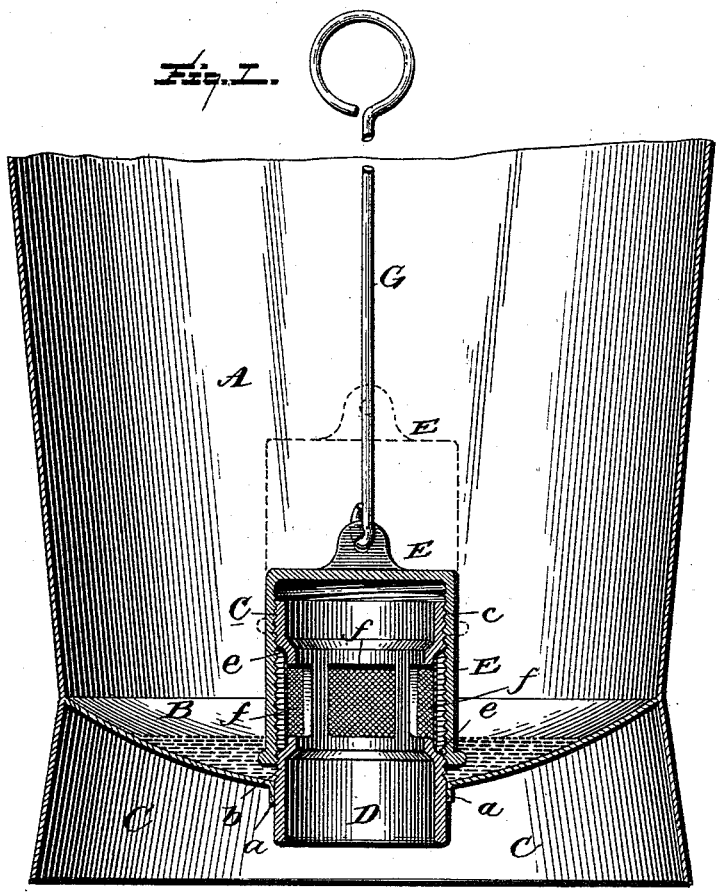
Figure 2:
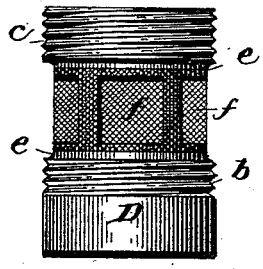

Figure 1 is a vertical central section through a pail provided with my improvements. Fig. 2 is a side elevation of the strainer removed.

Like letters of reference indicate like parts in both figures of the drawings.

Referring now to the details of the drawings by letter, A designates the wall of a milk-pail which is provided with a concave bottom B, and with a depending flange or rim C, which serves as a support for the pail to keep it from resting directly on the ground, so as to keep the bottom thereof from direct contact with the earth. Centrally this bottom is provided with an opening surrounded by a depending flange or rim *a*, and in this there is secured by solder or otherwise a tube or cylinder D, the lower end of which extends a short distance below the bottom to form a sort of neck which may be fitted within the neck of a can or other receptacle into which it may be desired to run the milk. This tube or cylinder is formed with a screw-threaded portion *b* near the bottom of the pail and at its upper edge with a screw-threaded portion *c*, and between these two screw-threaded portions the tube or cylinder is slightly reduced in diameter, as shown at *e*, and this reduced portion is provided with a reticulated medium *f*, as shown in both figures of the drawings.

E is a cap or cover internally threaded and fitted over the tube or cylinder D and engaging the upper and lower screw-threaded portions thereof, as shown in Fig. 1, the reduced portion of the tube permitting this engagement without touching the reticulated medium. This cover is provided with a suitable rod or handle G, connected therewith in any suitable manner—for instance, as shown in Fig. 1.

While milking or while the milk or other liquid is being poured or otherwise placed in the pail, the parts are in the position in which they are shown by full lines in Fig. 1. When it is desired to strain the milk, the pail can be set down on a milk-can, the neck of the tube fitting the neck of the can, and the cap is then removed, when the contents of the pail will be quietly drawn off without agitating it. The foam which always floats at the surface of milk (and which is usually full of hair, dirt, or other foreign substance) is left on the sides of the pail as the milk recedes and the heavier sediment settles to the bottom and is left in the bottom of the pail below the reticulated medium on the tube.

Various modifications in detail may be resorted to without departing from the spirit of or detracting from the merits of the invention.

What I claim as new is—

1. A pail having a concave bottom, combined with a tube arranged around an opening in said bottom and provided with screw-threaded portions with a reticulated medium between them, and a removable cap adapted to engage the screw-threaded portions and cover the reticulated medium, as and for the purpose specified.

2. The pail described, having a concave bottom with a central opening therein, a vertical tube extending through said opening and formed with an upper and a lower screw-threaded portion with a diametrically-reduced portion between the two and a reticulated medium at the reduced portion, and a removable screw-threaded cap adapted to engage the upper and lower threads and cover the reticulated medium, as shown and specified.

In testimony that I claim the above I have hereunto subscribed my name in the presence of two witnesses.

FERDINAND A. POLKA.

Witnesses:
  M. M. CHAMBERLIN,
  WM. CANFIELD.